US012629900B2

(12) United States Patent
Dando et al.

(10) Patent No.: US 12,629,900 B2
(45) Date of Patent: May 19, 2026

(54) METHOD FOR ACTIVELY COOLING AND SUPPORTING COMPONENTS DURING THERMOPLASTIC COMPOSITE WELDING

(71) Applicant: Spirit AeroSystems, Inc., Wichita, KS (US)

(72) Inventors: Kerrick Robert Dando, Wichita, KS (US); Mark Anthony Wadsworth, Wichita, KS (US); Samuel J. Slater, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 170 days.

(21) Appl. No.: 18/363,480

(22) Filed: Aug. 1, 2023

(65) Prior Publication Data

US 2025/0042099 A1 Feb. 6, 2025

(51) Int. Cl.
*B29C 65/00* (2006.01)
*B29C 65/36* (2006.01)

(52) U.S. Cl.
CPC ........ *B29C 66/003* (2013.01); *B29C 65/3636* (2013.01); *B29C 66/721* (2013.01)

(58) Field of Classification Search
None
See application file for complete search history.

(56) References Cited

U.S. PATENT DOCUMENTS 4,859,267 A * 8/1989 Knoll ................. B29C 65/7873
156/311
5,645,744 A * 7/1997 Matsen ............. B29C 66/91443
219/645

5,660,669 A 8/1997 Mittleider
8,794,950 B2 8/2014 Feigenblum et al.
10,286,608 B2 5/2019 Watanabe et al.
11,571,861 B2 2/2023 Wadsworth et al.

FOREIGN PATENT DOCUMENTS

DE 102012100620 A1 7/2013
JP H0538759 A 2/1993

OTHER PUBLICATIONS

European Search Report, Europe Patent Application No. 24192209.5, dated Jan. 3, 2025, 8 pages, Europe Patent Office, Munich Germany.

* cited by examiner

*Primary Examiner* — Christopher T Schatz
(74) *Attorney, Agent, or Firm* — Stinson LLP

(57) ABSTRACT

A method for welding thermoplastic composite parts while actively cooling includes placing a first composite part onto a surface of a tooling, placing a second composite part onto the first composite, pressing the second composite part toward the first composite part with an induction welding end effector, and providing a flow of air or gas through an opening extending through the shaping surface while induction welding the second composite part to the first composite part. The first composite is sandwiched between the surface of the tooling and the second composite. The flow of air or gas impinges on a bottom surface of the first composite part and is sufficient to press the first composite part toward the second composite part. Induction welding the second composite part to the first composite part is performed by applying induction heating while the flow of air is provided through the at least one opening.

13 Claims, 4 Drawing Sheets

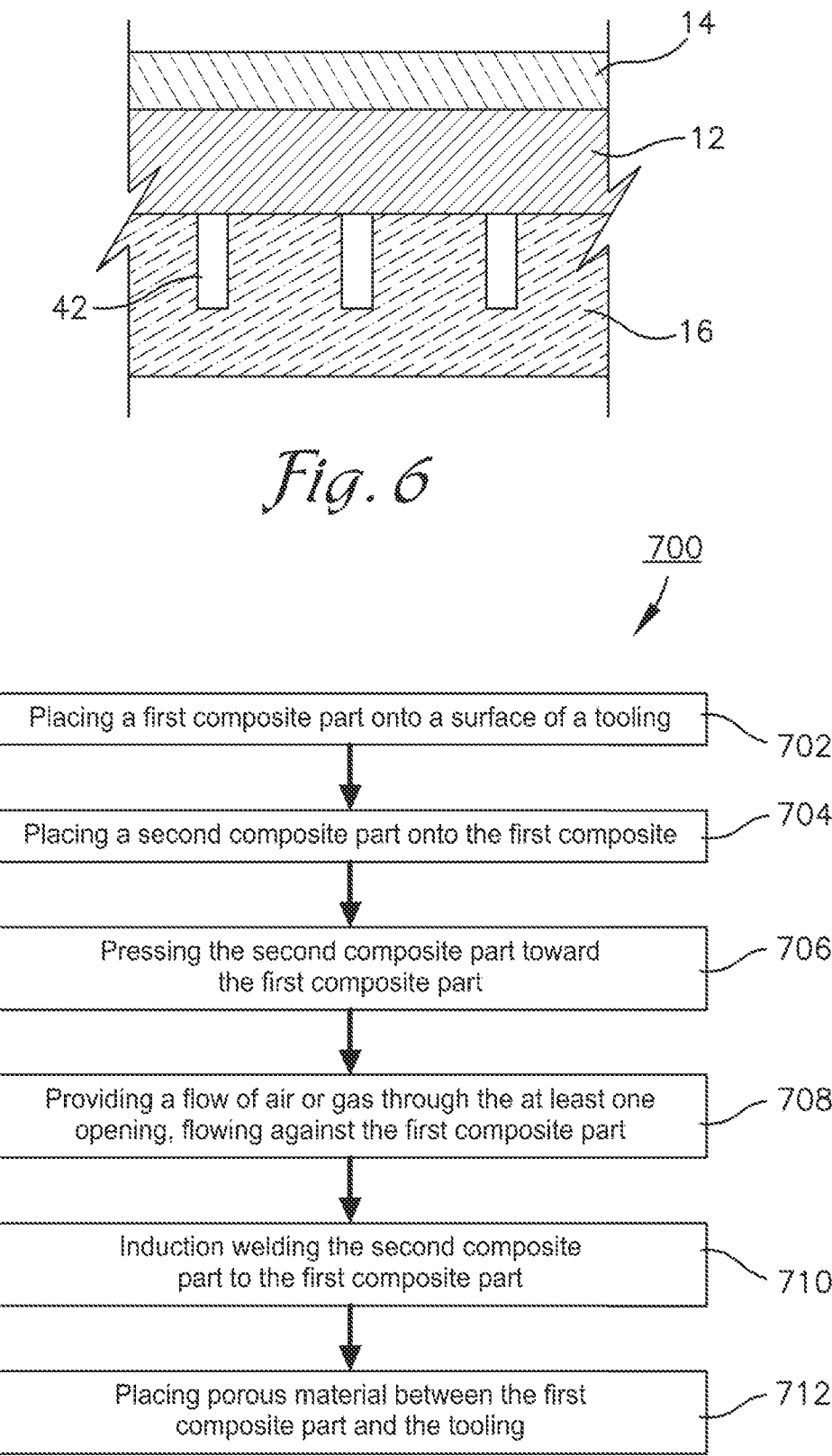

| |
|---|
| Placing a first composite part onto a surface of a tooling |

702

| |
|---|
| Placing a second composite part onto the first composite |

704

| |
|---|
| Pressing the second composite part toward the first composite part |

706

| |
|---|
| Providing a flow of air or gas through the at least one opening, flowing against the first composite part |

708

| |
|---|
| Induction welding the second composite part to the first composite part |

710

| |
|---|
| Placing porous material between the first composite part and the tooling |

METHOD FOR ACTIVELY COOLING AND SUPPORTING COMPONENTS DURING THERMOPLASTIC COMPOSITE WELDING

BACKGROUND OF THE INVENTION

Field of the Invention

Embodiments of the present invention relate to methods and systems for manufacturing composite parts. More particularly, embodiments of the present invention relate to methods and systems for active cooling of composite parts during induction welding thereof.

Description of the Related Art

Complex parts, such as those used in aerospace applications, are often manufactured from composite materials. Where the composite parts comprise materials such as thermoplastics, the skin may include several composite material layers which are first laid up and consolidated prior to laying up of any substructure that may be fixed to the skin. Following consolidation, the substructure may be laid onto the skin and the combination may be welded together, thereby fusing the substructure to the skin.

Traditional approaches for welding at such joints may include induction welding using an end effector placed near the thermoplastic composite joint. The end effector may have an induction coil that generates an alternating magnetic field, which generates eddy currents in the conductive fibers of the composite material that in turn melts the thermoplastic matrix of the composite parts being welded together.

Most traditional induction welding systems generate enough magnetic field intensity to generate heat through the thickness of the thermoplastic components to melt the entire region. Fully melting the thermoplastic composites requires high-tolerance tooling to prevent localized deformations, deconsolidation, or alteration of the part surfaces. Failure to adequately address this can be detrimental to the end product use, especially when one of the components being welded has an aerodynamic surface (e.g., a fuselage or wing skin).

Prior art methods for addressing such issues during composite part welding include having matched tooling to apply pressure on both sides of the part during welding, liquid-cooled tooling, and/or active cooling of the tooling surface before and/or after welding. While machined tooling with high tolerances that match the part's dimensions on the small scale is feasible, this solution becomes costly and problematic at larger scales where meeting the tolerance requirements can be challenging or impossible. Furthermore, electrically conductive tooling materials can alter the magnetic field making the process inefficient and materials with a high thermal diffusivity that are not electrically conductive are rare, are relatively expensive, and can be difficult to form to the desired shape. Tooling actively cooled with liquids can become more expensive and complex to fabricate with scale and have a potential for contamination/leaking of the fluid from the tooling into the parts being welded, which would not be acceptable for manufacturing. Other methods have been developed to alter the composite stacking sequence to alter the laminate conductivity to isolate the area of heat generation to the weld zone or faying surfaces of the components (and not the outer surfaces of the parts being welded together). While this eliminates the need for a complex tooling solution, it alters the part composition, which can affect the weight, mechanical, or physical properties of the part.

Therefore, there is a need for a method and system for thermoplastic welding that does not suffer from these and other deficiencies of the prior art.

SUMMARY OF THE INVENTION

Embodiments of the present invention solve the above-mentioned problems and provide a distinct advance in the art of manufacturing composite parts. More particularly, embodiments of the invention provide a system and method for thermoplastic composite welding, including the steps of placing a first composite part onto a surface of a tooling and placing a second composite part onto the first composite, such that the first composite is sandwiched between the surface of the tooling and the second composite. The tooling includes at least one opening for air or gas to flow through. In some embodiments, the method further includes the steps of providing a flow of air or gas through the at least one opening, with the flow of air or gas impinging on a bottom surface of the first composite part, and induction welding the second composite part to the first composite part by applying induction heating while the flow of air is provided through the at least one opening. The flow of air or gas is sufficient to press the first composite part toward the second composite part.

In another embodiment, a method for fusing thermoplastic composite parts includes the steps of laying a skin on a shaping surface of a tooling for maintaining the first outer surface in a shape of an outer mold line and laying a substructure on the first inner surface of the skin. The skin includes a first outer surface and a first inner surface, and the first inner surface of the skin has a first faying surface. The substructure has a flange and at least one raised segment. The flange has a second outer surface and a second inner surface, the second inner surface of the flange having a second faying surface. The second faying surface contacts the first faying surface of the skin when placed thereon. In some embodiments, the method further includes the steps of compressing the substructure toward the skin with an induction welding end effector, flowing cool air or a gas through at least one opening of the shaping surface and into contact with at least a portion of the first outer surface of the skin, and applying induction heat to the flange to fuse the flange of the substructure to the skin such that at least one of the first faying surface and the second faying surface reaches the processing temperature of the thermoplastic matrix. The cool air or gas is at a lower temperature than a processing temperature of a thermoplastic matrix of the skin.

In yet another embodiment, a system for thermoplastic composite welding of at least two composite parts includes a tooling with a shaping surface having a plurality of channels or a texture in a first region and at least one opening or manifold fluidly coupled with the plurality of channels or the texture of the first region. Furthermore, the system includes a first composite part resting on the shaping surface of the tooling and a second composite part resting on the first composite part and aligned over a portion of the first composite part resting on the first region of the shaping surface. The system also includes an induction welding end effector pressing the second composite part toward the first composite part and a cooling source that is fluidly coupled with the at least one opening or manifold, providing a flow of air or gas sufficient to press the first composite part toward the second composite part. The flow of air or gas from the cooling source is cooler than a processing temperature of the first composite part or the second composite part.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4A is a top plan view of the tooling's distribution channels of FIG. 3, with a wavy texture formed into the shaping surface thereof in accordance with embodiments of the present invention;

FIG. 4B is a top plan view of the tooling's distribution channels of FIG. 3 in accordance with an alternative embodiment of the invention, with a plurality of cooling channels extending laterally from a manifold of the tooling;

FIG. 6 is a fragmentary, cross-sectional plan view taken along line 6-6 in FIG. 5 in accordance with embodiments of the present invention; and FIG. 7 illustrates at least a portion of the steps of an exemplary method for induction welding composite parts according to an embodiment of the present invention.

Figure 1:
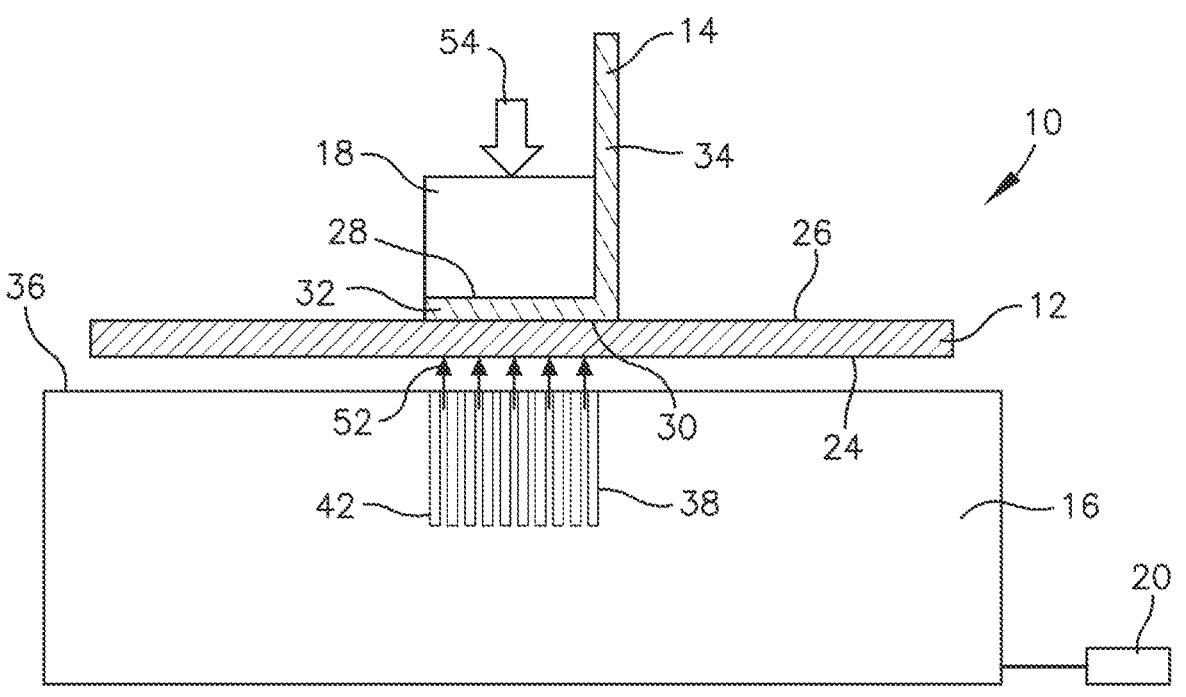
FIG. 1 is a cross-sectional schematic view of a system, constructed in accordance with various embodiments of the present invention, for welding two composite parts together while actively cooling one of the surfaces thereof.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

The present invention solves the above-described prior art problems and provides a distinct advance in the art of induction welding composite parts. As in the various embodiments depicted in FIGS. 1-3, a system 10 for thermoplastic composite welding of at least two composite parts may include a first composite part 12, a second composite part 14, a tooling 16, an end effector 18, and a cooling source 20. Furthermore, in some embodiments as depicted in FIG. 2, the system 10 further comprises a porous material 22 placed between first composite part 12 and the tooling 16 for compliance and/or to allow for escapement of cooling fluid (e.g., forced air or gas) away from a weld region to cool a larger region of the resulting part.

Figure 2:
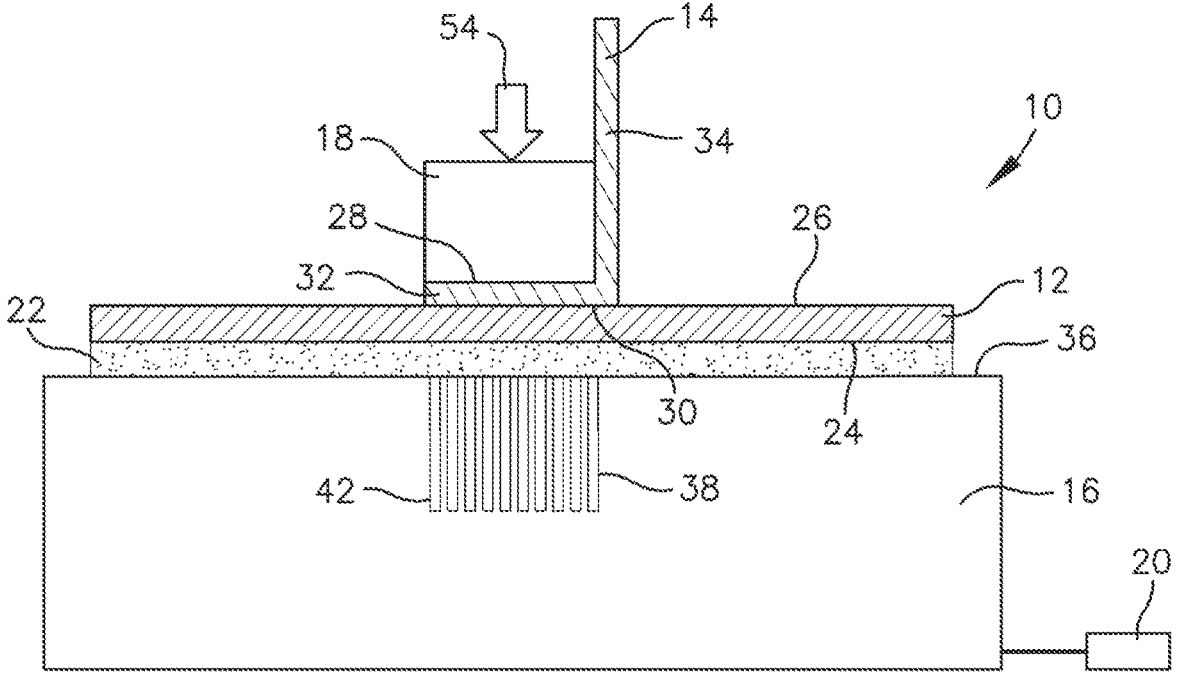
FIG. 2 is a cross-sectional schematic view of the system of FIG. 1, with a porous material added between the composite parts and a shaping surface of tooling of the system.

As depicted in FIGS. 1-2, the first composite part 12 may be a skin or composite skin made of a composite material. For example, the first composite part 12 may form the skin and/or outer surface of aircraft parts such as a fuselage or wing skin. The first composite part 12 may have a first outer surface 24 and a first inner surface 26. The first inner surface 26 may comprise or may serve as a first faying surface to which the second composite part 14 abuts and/or is welded or joined to using the methods described herein. The first outer surface 24 of the first composite part 12 may be configured to be an outer surface of an aircraft component and thus an aerodynamic surface.

The second composite part 14 may be a substructure likewise made of composite material. For example, the second composite part 14 may be a spar, stringer, rib, L-beam, U-beam, or other such structures, such as those used in a fuselage or for an aircraft wing. The second composite part 14 may have a second outer surface 28 and a second inner surface 30 opposite the second outer surface 28. The second inner surface 30 of the second composite part 14 may comprise or may serve as a second faying surface to which the first faying surfaces welds or joins or abuts. The second composite part 14, in one or more embodiments, rests on or has at least one portion which rests on the first composite part 12. For example, in some embodiments, the second composite part 14 includes a flange 32 and a raised segment 34 angled relative to the flange 32, and the flange 32 rests on the first composite part 12. The angle of the raised segment 34 relative to the flange 32 may be, for example, approximately 90-degrees (plus or minus five degrees), such as an L-beam, stringer, or rib, or may have any angle greater than 0-degrees and less than 180-degrees.

Composite materials, such as those used for the first composite part 12 and the second composite part 14, generally include at least two constituent components—a reinforcement material and a matrix material. For example, the composite material may include a plurality of layers of composite ply each coated in or suspended in a thermoplastic matrix. To initially form the first composite part 12 and/or the second composite part 14, the composite plies may be consolidated under pressure and heated to form composite laminate skins, substructures, or parts. The reinforcement material in composite material generally provides mechanical strengthening properties, such as high tensile strength, to the composite material, while the matrix material acts as a binder to hold the reinforcement material together. The matrix material may be thermoplastic matrix material that is meltable or generally deformable at a threshold temperature, also referred to herein as a processing temperature. The reinforcement material and the matrix material may possess additional properties not discussed herein. Furthermore, the composite material may include additional components not discussed herein.

Examples of reinforcement materials that may be used with the first composite part and the second composite part may include, but are not limited to, fiber materials such as carbon fiber, boron fiber, fiberglass, aramid fiber, ceramic fiber, and the like without departing from the spirit of the present invention, although with electrically non-conductive fibers the heating would be exclusively dielectric or a susceptor would be needed. The matrix material may typically be in the form of thermoplastic polymers such as polycarbonates, polyamides, polyphenylene sulfide, polyetherimide, polyetheretherketone, polyetherketoneketone, and the like. In other embodiments, the matrix material may additionally or alternatively be in the form of thermosetting polymer resins, such as epoxies, bismaleimides, vinyl esters, phenolics, polyimides and the like, among others. It should also be noted that mixtures of composite materials may be used to form a single composite part without departing from the spirit of the present invention.

As depicted in FIGS. 1-2, the tooling 16 may be any rigid tooling configured for maintaining its rigidity under processing pressure and processing temperatures used for induction welding of the composite parts. In some embodiments, the tooling 16 may have a shaping surface 36 such as a flat shaping surface or a curved shaping surface matching a general shape or profile of the first outer surface 24 of the first composite part 12. For example, in one or more embodiments, the first composite part 12 rests on the shaping surface 36 of the tooling 16, as later described herein. The shaping surface 36 may form a shape, profile, or an outer mold line of the skin or the first composite part 12, for example.

The tooling 16 has formed therein at least one opening 38 through which gas or air from the cooling source 20 may be forced to impinge on the first outer surface 24 of the first composite part 12. For example, as depicted in FIGS. 1-2, the at least one opening 38 may be a plurality of fluid distribution channels through which air or gas may be forced up through openings in the shaping surface 36. In other embodiments, as depicted in FIGS. 3-6, the at least one opening 38 may include, for example, a manifold 40 fluidly coupled to a plurality of openings, channels 42 (as in FIG. 4B), or textures 44 (as in FIG. 4A) formed into the shaping surface 36. The region of the shaping surface 36 where the plurality of openings, channels 42, or textures 44 are located is referred to herein as a first region 46 of the shaping surface 36 of the tooling 16. As later described herein, the first region 46 may be aligned with a location at which the first and second composite parts 12, 14 are welded together and/or aligned with the end effector 18. For example, the second composite part 14 may be aligned over a portion of the first composite part 12 resting on the first region 46 of the shaping surface 36 (or hovering thereabove, once the flow of air or gas is applied).

Figure 5:
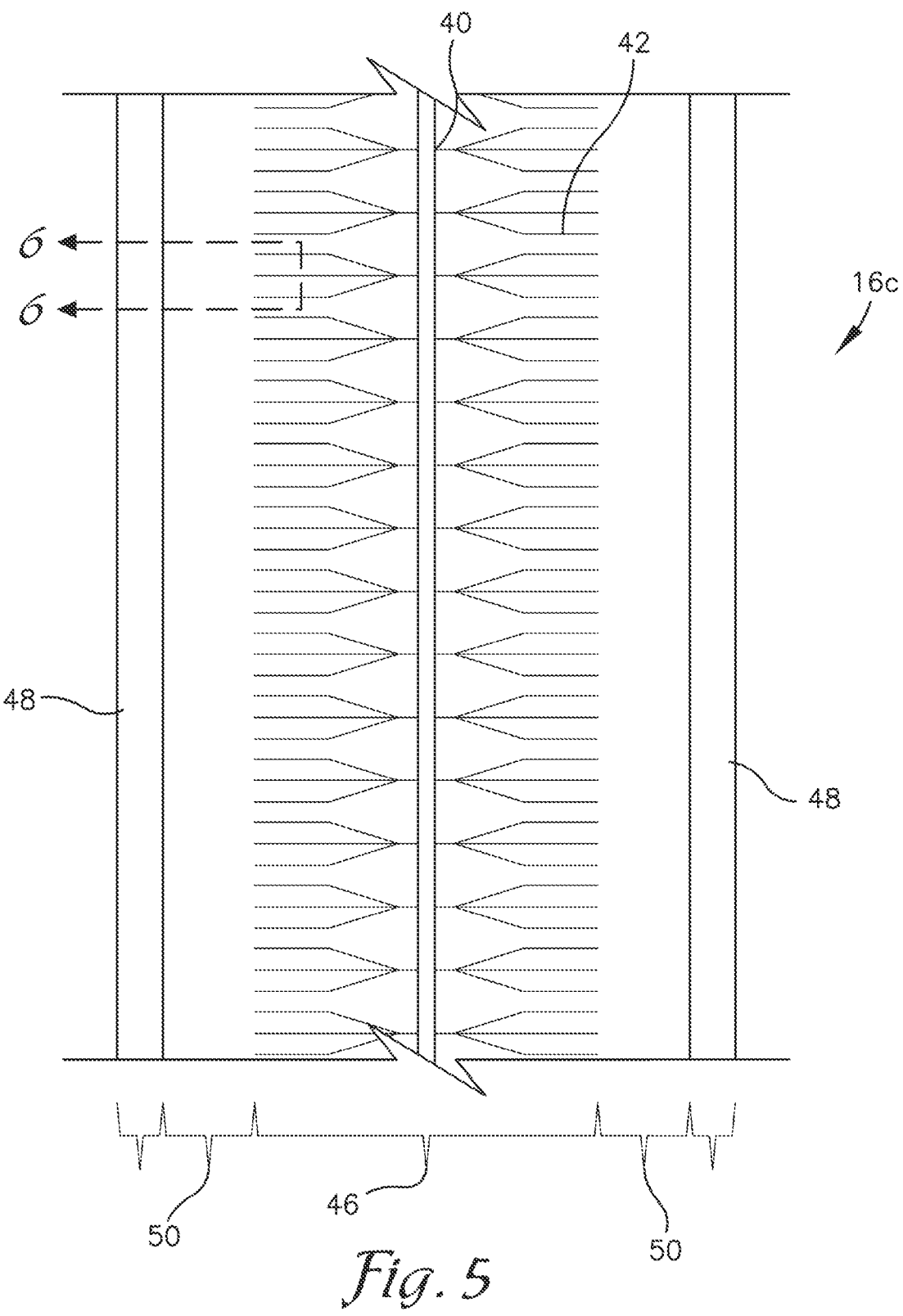
FIG. 5 is a fragmentary top plan view of the tooling of FIG. 3 in accordance with embodiments of the present invention.

In some embodiments, the tooling 16 further comprises at least one exit conduit 48 through which exhaust created by the flow of air or gas impinging on a bottom surface (i.e., the first outer surface 24) of the first composite part 12 escapes in a direction away from the first composite part 12. For example, the at least one exit conduit 48 can include at least two exhaust manifolds on opposite sides of the first region 46 through which exhaust created by the flow of air or gas in the first region 46 escapes in a direction away from the first composite part 12. Furthermore, as depicted in FIG. 5, a space between the first region's channels 42 and the exhaust manifolds (e.g., exit conduits 48), there may be a backpressure or a choked flow region 50. In some embodiments, due to this choked flow at the edges of the first region 46, static pressure of air or gas exceeds applied welding pressure (e.g., pressure applied by the end effector 18). Note that in some embodiments, such as in FIG. 4A, the channels 42 may be replaced with the texture 44. Furthermore, in one or more embodiments, a combination of both the channels 42 and the texture 44 may be formed into a surface of the tooling without departing from the scope of the technology described herein.

Note that in embodiments where the channels 42 are formed into the first region 46, spaces between the channels 42 (as depicted in FIG. 6) still do not leave undesirable imprints on the first outer surface 24 of the first composite part 12 because of conduction that cools the shaping surface or tooling material between the channels 42. Furthermore, in some embodiments as depicted in FIG. 1, an upward flow force 52 pressing the first composite part 12 away from the tooling 16 provides a small gap between the first outer surface 24 of the first composite part 12 and the tooling 16, such that at least a portion of the first composite part 12 is hovering via this air or gas pressure above the tooling 16. This advantageously can prevent undesirable mark-off on the aerodynamic surface of the first composite part 12. That is, the air flowing through the channels 42 and/or the texture 44 in the tooling 16 may retain sufficient static pressure to provide a reaction pressure to prevent the first composite part 12, with a matrix material generally softened during induction welding, from embedding in the channels 42 or texture 44 and transferring this texture or mark-off to the first outer surface 24.

Figure 3:
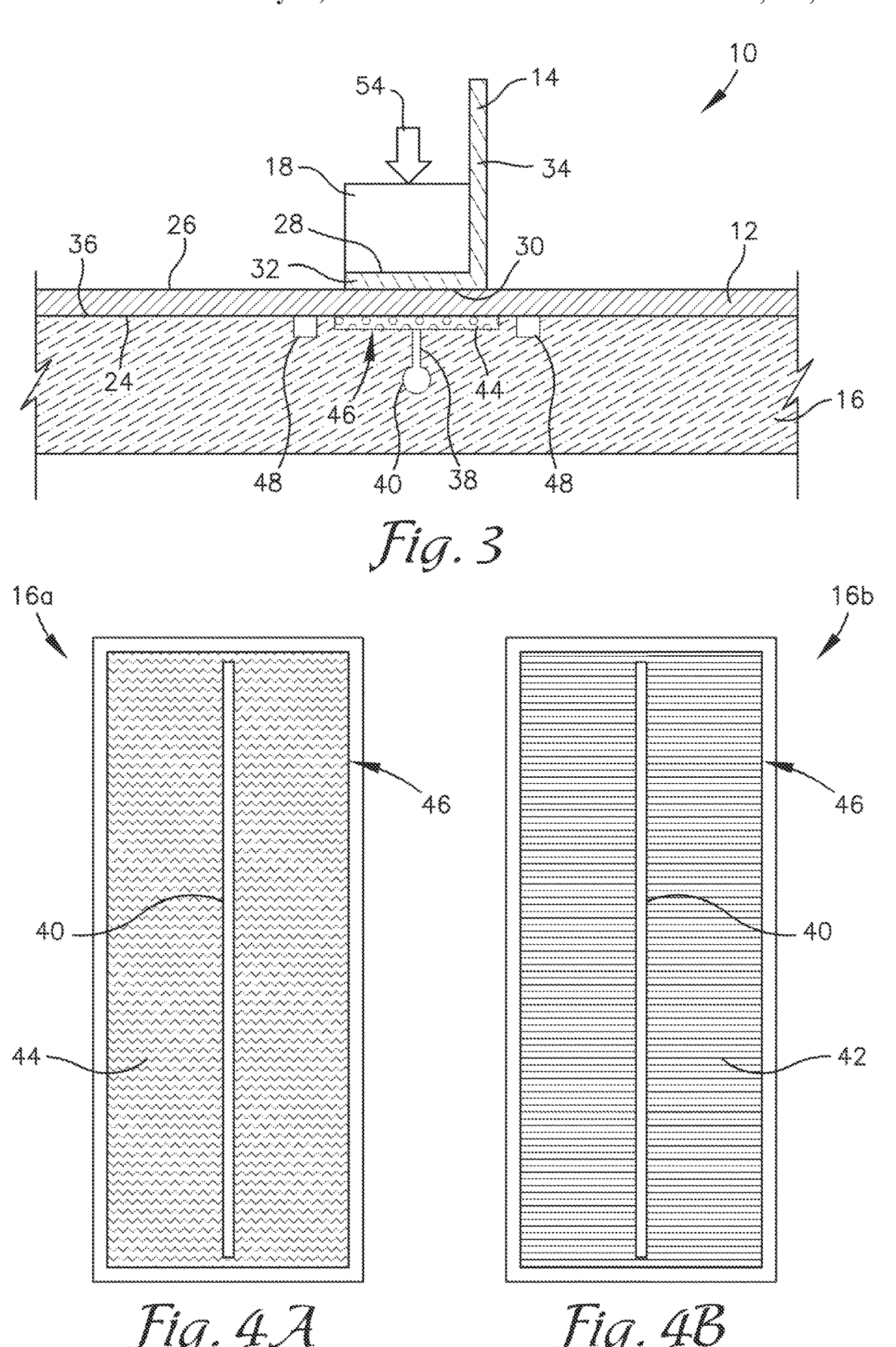
FIG. 3 is a fragmentary cross-sectional view of an alternative embodiment of the system of FIG. 1, with the tooling including a manifold, distribution channels, and exhaust manifolds in accordance with embodiments of the present invention.

As depicted in FIGS. 1-3, the end effector 18 (also known as a welding shoe), in one or more embodiments, is an induction welding end effector pressing the second composite part toward the first composite part, as illustrated by force arrow 54. Specifically, the end effector 18 may include an induction coil and/or other end effector components suitable for applying pressure (e.g., clamping pressure) and/or an induction-welding magnetic field radiating toward the composite parts 12, 14. For example, in some embodiments, the end effector 18 may include an induction coil, a magnetic flux control material, and/or an elastomeric pressure pad. The end effector may be operated manually and/or may be attached to a frame structure suitable for applying downward pressure/force against the second composite part 14 during induction welding. The induction coil is coupled to an electrical power source for passing alternating electrical current through a magnetic induction region positioned near a bottom end of the end effector 18 for passing an alternating magnetic field through the composite parts 12, 14. In some embodiments, the elastomeric pressure pad promotes compliance to texture or contoured surfaces of the second outer surface 28 of the second composite part 14. In some embodiments, the elastomeric pressure pad may also function as the heat sink.

The cooling source 20 may be, for example, a fan, blower, or source of compressed air or gas. The cooling source is continually or selectively (e.g., via a valve or the like) fluidly coupled to or configured to be fluidly coupled with the at least one opening 38 or manifold 40. That is, the cooling source 20 provides a flow of air or gas sufficient to press the first composite part 12 toward the second composite part 14. In one or more embodiments, the flow of air or gas from the cooling source 20 is cooler than the processing temperature of the first composite part 12 or the second composite part 14.

The porous material 22 may be located between the first composite part 12 and the tooling 16, providing for escapement of the flow of air or gas outward, away from the first region 46 where the first composite part 12 and the second composite part 14 are being induction welded together. For example, the porous material may be a fiberglass sheet of material or other non-conductive porous materials useful for allowing the flow of air or gas to be disbursed therethrough.

The flow chart of FIG. 7 depicts in more detail the steps of an exemplary method 700 for induction welding or fusing composite parts together while actively cooling at least one of the surfaces of at least one of the composite parts. In some embodiments of the invention, various steps may be omitted and/or steps may occur out of the order depicted in FIG. 7 without departing from the scope of the invention. For example, two blocks shown in succession in FIG. 7 may in fact be executed substantially concurrently, or blocks may sometimes be executed in the reverse order depending upon the functionality involved.

Specifically, the method 700 includes a step of placing a first composite part onto a surface of a tooling, as depicted in block 702, and placing a second composite part onto the first composite, as depicted in block 704, such that the first composite is sandwiched between the surface of the tooling and the second composite. For example, the step depicted in block 702 could include laying the first composite part 12 (e.g., a skin comprising the first outer surface 24 and the first inner surface 26) on the shaping surface 36 of the tooling configured to maintain the first outer surface 24 in a shape of an outer mold line. As described above, the first inner surface 26 of the first composite part 12 or skin may comprise a first faying surface. In some examples of the step depicted in block 704, placing the second composite part 14 includes laying a substructure on the first inner surface 26 of the skin or the first composite part 12. As depicted in FIGS. 1-3, the substructure may be substantially L-shaped and may have the flange 32 and the raised segment 34. However, other substructures may be used for this step without departing from the scope of the invention herein. The flange 32, as described above, may have the second outer surface 28 and the second inner surface 30, with the second inner surface 30 of the flange 32 comprising the second faying surface. After the step depicted in block 704, the second faying surface contacts the first faying surface of the skin or the first composite part 12.

The method 700 further includes a step of pressing the second composite part toward the first composite part, as depicted in block 706. This can be accomplished using an upper mold tooling, the induction welding end effector 18, and/or a vacuum bag compressed toward the second composite part 14, for example. However, other methods of providing compressive force against the second composite part 14 and/or providing resistance to upward movement of the second composite part 14 may be provided without departing from the scope of the invention described herein. In one or more embodiments, the step of block 706 includes pressing the second composite part 14 (e.g., the substructure) toward the first composite part 12 (e.g., the skin) via the induction welding end effector 18, with the flow of air or gas being sufficient to provide an equal and opposite force to that exerted by the induction welding end effector 18.

The method 700 further includes a step of providing a flow of air or gas through the at least one opening 38, as depicted in block 708. This step may be accomplished by opening a valve to release the flow of air or gas through the at least one opening 38 or otherwise connecting the pressurized cooling supply with the at least one opening 38 such that the air or gas flow therethrough. During this step, the flow of air or gas impinges on a bottom surface (e.g., the first outer surface 24) of the first composite part 12 (e.g., the skin). The step depicted in block 708 may be performed simultaneously with the fusing or induction welding of the first composite part 12 with the second composite part 14 (e.g., the substructure). Additionally or alternatively, the step depicted in block 708 may occur before, during, and/or after the fusing or induction welding described herein. In some embodiments, the flow of air or gas is sufficient to press the first composite part 12 toward and/or compress the first composite part 12 against the second composite part 14. In some embodiments, the at least one opening 38 includes the manifold 40 connected to a pressurized cooling supply for supplying the flow of air or gas thereto, and the manifold 40 then provides the flow of air or gas to the plurality of channels 42 or the texture 44 in the first region 46 as described above. In one or more embodiments, the cool air or gas is at a lower temperature than a processing temperature of one or both of the composite parts (e.g., the processing temperature of a thermoplastic matrix of the skin).

In one or more embodiments, the air or gas used in the step depicted in block 708 may have a fluid entrained therein which vaporizes at a temperature below a deformation temperature of the first composite part 12. There may optionally be a mist (e.g., a mist of water) entrained with the air or gas in some embodiments. While pure liquids are inconvenient and could possibly contaminate the weld, the method steps herein may include adding a small amount of mist to the air or other gas to increase thermal capacity of the flow as well as add a phase change (latent heat of vaporization) to the mechanisms for extracting heat.

As described above, exhaust created by the flow of air or gas impinging on a bottom surface (i.e., the first outer surface 24) of the first composite part 12 may escape through the exit conduits 48 or exhaust manifolds in a direction away from the first composite part 12. As discussed above in regard to embodiments with exhaust manifolds, the choked flow region 50 at the edges of the first region 46, allows static pressure of air or gas to be equal to or exceed applied welding pressure (e.g., pressure applied by the end effector 18). This compressive force assists in preventing delamination of either of the composite parts during the induction welding. However, in some embodiments depicted in FIGS. 1-2, the exhaust may exit out sides of the composite parts being welded, and the exit conduits 48 or exhaust manifolds can be omitted.

The method 700 also includes a step of induction welding the second composite part 14 to the first composite part 12, as depicted in block 710. This may be accomplished by applying induction heating while the flow of air is provided through the at least one opening 38. The induction welding may raise a temperature of the first and second faying surfaces to a processing temperature of the thermoplastic matrix of the composite parts 12, 14 for a predetermined length of time, thereby welding the first and second composite parts 12 together. For example, in embodiments where the second composite part 14 is an L-shaped substructure, the step depicted in block 710 may include applying induction heat to the flange 32 to fuse the flange 32 of the substructure to the skin such that at least one of the first faying surface and the second faying surface reaches the processing temperature of the thermoplastic matrix of the flange 32 and the skin. During steps 708 and 710, the highest areas on the porous material 22, flow media, texture 44, channels, 42, or other features may react to the clamping force (i.e., as depicted by the force arrow 54) while relieved areas of the first region 46 enable air flow.

Additionally or alternatively, in some embodiments the method 700 may further include a step of placing the porous material 22 (e.g., a flow media) between the first composite part 12 and the tooling 16, as depicted in block 712, prior to the step depicted in block 702 of placing the first composite part onto the shaping surface 36 of the tooling 16. This optional or additional step depicted in block 712, as also depicted in FIG. 2, may provide for escapement of the flow of air or gas outward, away from a region where the first composite part and the second composite part are being induction welded together (e.g., the first region 46 described above).

Heat may be applied via the induction welding end effector 18 until faying surfaces of the two composite parts 12, 14 heat up to the processing temperature thereof (e.g., the processing temperatures of the thermoplastic matrix of the composite parts 12, 14), resulting in a weld between the first and second composite parts 12, 14. After completion of the step depicted in block 710, the two composite parts 12, 14 are held under pressure between the end effector 18 and the tooling 16 for a desired time period or to a specific temperature to prevent deconsolidation of the welded-to-gether parts. Pressurized air may then be turned off from the tooling 16 and the end effector's clamping forces may be removed. The end effector 18 may then move to a next weld station, each with cooling features similar to those described above in the tooling 16, and the method 700 may be repeated for other parts to be welded onto the first composite part 12, until the resulting part is fully assembled. For example, if multiple ribs or stringers are being induction welded onto an aircraft skin, the method 700 may be repeated for each of the ribs or stringers until the resulting fuselage or wing is fully assembled.

As described above, the methods and systems described herein utilize pressurized air or gas to both apply consolidation force on a back side (e.g., the first outer surface 24) of the composite parts being welded and cool that back side to prevent surface deformation during the welding process. Advantageously, cooling fluid (e.g., air or gas) actively distributed through the tooling as described above allows external surfaces of an aircraft component to be smoother and more aerodynamic. Furthermore, an equal and opposite force can be applied through the active cooling system and method described above, to react to the force exerted by the induction welding end effector. Another potential advantage with the system and method described herein is that the active cooling system does not require exact machining to match any unique geometrical components of the part placed in contact (e.g., pad-ups, joggles, etc.) as the flowing air or gas acts as a means of pressure application while simulta-neously consistently cooling the surface to prevent decon-solidation, to prevent mark-off on the first outer surface 24 from the texture 44, channels 42, or imperfections of the shaping surface 36, or to prevent other such defects.

Having thus described various embodiments of the invention, what is claimed as new and desired to be protected by Letters Patent includes the following:

1. A method for thermoplastic composite welding, the method comprising:

placing a first composite part onto a surface of a tooling, wherein the tooling comprises at least one opening, wherein the first composite part has a bottom surface and a top surface and wherein said placing the first composite part comprises placing the first composite part so that the bottom surface is supported against the tooling and the top surface side faces away from the tooling;

placing a second composite part onto the first composite, such that the first composite is sandwiched between the surface of the tooling and the second composite, wherein the second composite part has a bottom surface and a top surface and wherein said placing the second composite part comprises placing the second composite part so that the bottom surface of the second composite part faces the top surface of the first composite part and the top surface of the second composite part faces away from the first composite part;

providing a flow of air or gas through the at least one opening, with the flow of air or gas impinging on a bottom surface of the first composite part, wherein the flow of air or gas is sufficient to press the first com-posite part toward the second composite part; and induction welding the second composite part to the first composite part by applying induction heating while the flow of air is provided through the at least one opening, wherein said applying induction heading comprises pressing an induction welding end effector downward onto the top surface of the second composite part to apply downward pressure onto the first composite part and the second composite to promote intimate contact between the top surface of the first composite part and the bottom surface of the second composite part while passing an electric current through an induction coil of the induction welding end effector;

wherein said providing the flow of air or gas convectively cools the bottom surface of the first composite part from below while the inductive heating is simultane-ously provided via the induction welding end effector from above the top surface of the second composite part.

2. The method of claim 1, further comprising pressing the second composite part toward the first composite part using an upper mold tooling, an induction welding end effector, or a vacuum bag compressed toward the second composite part.

3. The method of claim 1, wherein the flow of air or gas has a fluid entrained therein which vaporizes at a tempera-ture below a deformation temperature of the first composite part.

4. The method of claim 1, wherein the at least one opening includes a manifold providing the flow of air or gas to a plurality of channels or a textured region of the surface of the tooling, wherein the manifold is connected to a pressur-ized cooling supply for supplying the flow of air or gas thereto.

5. The method of claim 1, wherein the tooling further comprises at least one exit conduit through which exhaust created by the flow of air or gas impinging on the bottom surface of the first composite part escapes in a direction away from the first composite part.

6. The method of claim 5, wherein the at least one exit conduit comprises at least two exhaust manifolds on opposite sides of an induction welding region on which the first composite part and the second composite part are being induction welded together.

7. The method of claim 1, further comprising pressing the second composite part toward the first composite part via an induction welding end effector, wherein the flow of air or gas is sufficient to provide an equal and opposite force to that exerted by the induction welding end effector.

8. The method of claim 1, wherein the flow of air or gas is sufficient to hover at least a portion of the first composite part above the surface of the tooling.

9. The method of claim 1, wherein the induction heating is provided via conducted heat, magnetic fields, or radiant heat via an induction coil of an induction welding end effector applied to at least a portion of the second composite part.

10. The method of claim 1, further comprising placing a porous material between the first composite part and the tooling, providing for escapement of the flow of air or gas outward, away from a region where the first composite part and the second composite part are being induction welded together.

11. The method of claim 1, wherein the first composite part comprises a skin, and wherein the second composite part comprises a substructure having a flange and at least one raised segment extending from the flange.

12. The method of claim 1, wherein the surface of the tooling is a shaping surface configured to maintain the bottom surface of the first composite part in a shape of an outer mold line.

13. The method of claim 4, wherein placing the second composite part comprises aligning the second composite part over a portion of the first composite part that rests on the plurality of channels or the textured region of the surface of the tooling.

\* \* \* \* \*